United States Patent
Orlicki et al.

[11] Patent Number: 5,825,399
[45] Date of Patent: Oct. 20, 1998

[54] DATA-DEPENDENT THERMAL COMPENSATION FOR AN LED PRINTHEAD

[75] Inventors: David Mark Orlicki, Rochester; Karen Lynn Herczeg, Webster; David Michael McVay, Rochester, all of N.Y.

[73] Assignee: Eastman Kodak Company, Rochester, N.Y.

[21] Appl. No.: 608,161

[22] Filed: Feb. 28, 1996

[51] Int. Cl.⁶ ..................................................... B41J 2/47
[52] U.S. Cl. ......................... 347/237; 347/240; 347/247
[58] Field of Search .................................. 347/247, 237, 347/240, 255, 239

[56] References Cited

U.S. PATENT DOCUMENTS

| | | |
|---|---|---|
| 4,771,219 | 9/1988 | Ludolf et al. . |
| 4,952,949 | 8/1990 | Uebbing . |
| 4,982,203 | 1/1991 | Uebbing et al. . |
| 5,200,765 | 4/1993 | Tai .......................................... 347/240 |
| 5,264,868 | 11/1993 | Hadley et al. . |
| 5,657,069 | 8/1997 | Kelly et al. ............................. 347/237 |

*Primary Examiner*—Mark J. Reinhart
*Attorney, Agent, or Firm*—Walter S. Stevens

[57] ABSTRACT

Apparatus for estimating LED printhead junction temperature as a function of an input data stream, and for automatically compensating the printhead drive signal to maintain proper printer calibration to provide junction-level compensation for efficiency loss of an LED as the LED warms due to thermal energy generation from an electrical drive current is effected by a plurality of selectable LED temperature-specific look up tables constructed for a plurality of different LED temperatures. The selected look up table produces an output for driving the LED when the selected look up table is accessed by the input data. A model of the thermal characteristics of the LED, its heat sink, and the structure attaching the LED to the heat sink is adapted to produce an estimate of the temperature of the LED as a function of the image data. An address decoder selects one of the plurality of look up tables to process the input data stream in accordance with the estimate produced by the model. The estimate produced by the model may be quantized into a plurality of steps equal in number to the plurality of look up tables. The model may be implemented by a low order finite impulse filter executed in programmable logic. The estimate produced by the model is updated on a per pixel basis, whereby the appropriate temperature dependent look up table is accessed for each pixel to be printed.

8 Claims, 3 Drawing Sheets

DATA-DEPENDENT THERMAL COMPENSATION FOR AN LED PRINTHEAD

CROSS-REFERENCE TO RELATED APPLICATION

Cross-reference is made to commonly assigned, co-pending U.S. patent application Ser. No. 123,839, entitled METHOD AND APPARATUS FOR EXPOSING PHOTOSENSITIVE MEDIA WITH MULTIPLE LIGHT SOURCES filed in the names of D. Smith et al. on Sep. 20, 1993.

BACKGROUND OF THE INVENTION

1. Technical Field

The present invention relates in general to the field of electronic printing of digitized images and, specifically, to electronic printing systems that utilize a printhead having multiple LED light sources to record information by scanning a photosensitive surface.

2. Background Art

Printing of digitized images is often accomplished by modulating the intensity of a light beam that forms a writing spot on a photosensitive surface as the beam moves relative to that surface. One common motion pattern moves the light beam rapidly along a single line as a single row of image pixels and the light beam is modulated with "clocked out" image information starting from a fixed margin location on a page. The beam or the media is then indexed to the next line of the page and the beam is returned to the margin before writing the next row of pixels.

Other digital printers use an array of light emitting diodes (LED's) positioned on a rotor which spins within a media support cylinder. For example, commonly assigned, co-pending U.S. patent application Ser. No. 123,839 entitled METHOD AND APPARATUS FOR EXPOSING PHOTOSENSITIVE MEDIA WITH MULTIPLE LIGHT SOURCES filed in the name of D. Smith et al. on Sep. 20, 1993, discloses a rotary printing system 10 employing a multi-beam color exposure system illustrated in FIGS. 1 and 2, and includes a rotor 11 coupled to a drive motor supported by a support pedestal structure 16 which hangs from a translator base 18 which is supported for movement along a pair of guide rails 20. The rotor is arranged to spin and move axially within a stationary cylindrical support 22 which is provided with a sheet of photosensitive material 24 on the inner surface thereof. Rotor 11 is attached to a linear translation assembly comprising pedestal structure 16 and translator base 18, and a lead screw mechanism 26 driven by a stepper motor 28, with the lead screw being connected to translator base 18 by a coupling 30. The rotor is simultaneously rotated in a fast scan direction and is translated past stationary cylindrical support 22 in the slow scan direction (axially), thereby achieving a raster scan pattern on the photosensitive media held within the stationary cylindrical support.

An LED printhead assembly 32 is mounted in rotor 11 and comprises an array 34 of LED's (see FIGS. 2 and 3), and a projection lens assembly. The LED array comprises twelve individual LED's 39 fabricated on a relatively thick block 40 of copper which acts as an efficient heat sink structure. Each individual LED 39 is formed with an aperture cathode electrode 41. A polyimide flex circuit 42 with an appropriate number of gold-flashed copper signal traces 43 and bond pads, is soldered or adhesively traces 43 and bond pads, is soldered or adhesively bonded to the copper heat sink. The back surface of the flex circuit is a solid copper ground plane which functions as the electrically common anode connector. An individual electrical connection is made to each LED by a wire bond 44 from the LED cathode surface to the bond pads on flex circuit 42. The opposite end of the flex circuit is connected to the LED drive electronics in rotor 11.

A precision aperture array mask is fabricated using a glass substrate 46 coated on both surfaces with an anti-reflection coating and subsequently coated (on one surface only) with an electrically non-conductive black opaque coating 48.

It is known that LED's are inherently inefficient devices with significant amounts of unwanted thermal energy generated as a result of normal operation. This thermal energy generation increases rapidly with increased drive current. LED's become less efficient as they warm, causing the light output to vary as a function of temperature. Various schemes have been used to compensate such systems for thermal efficiency losses experienced by LED'S. Such compensation has traditionally been focused on effects characterized by the thermal time constant of the bulk mounting substrate of the LED's. However, the light emitting junction of the LED's are somewhat removed from the bulk mounting substrate, such as by some combination of deposit electrode, semiconductor spacing, and soldering flux; all operable to create a thermal barrier. The time constant of this internal junction-to-mount thermal path from the LED junction to the mounting substrate has been previously neglected in short; typically on the order of a single pixel exposure time for prior, parallel line oriented, writing devices.

For the rotary LED printing device described in the above-mentioned co-pending U.S. patent application however, the LED's are used to write in the fast scan direction, and thus the thermal time constant of the junction-to-mount thermal path may be on the order of one hundred pixel exposure times in duration. Accordingly, variations in light emitting efficiency becomes noticeable in image regions of uniformly high energy exposure. Thus, it becomes highly desirable to provide junction-level thermal compensation for such printers.

FIG. 4 is a schematic block diagram of the LED array printhead conventional data path of the printer of FIG. 1. A pixel of image information at 50 is represented by three 8-bit subpixel quantities representing red, green and blue records. Subpixel data is linearly related to desired print densities. In order to compensate for the nonlinear relationship between LED current and developed density which is characteristic of most image receiver technologies (say, silver halide photographic media), the 8-bit subpixel data are processed through 12-bit look up tables 52, 54, and 56. The 12-bit output of the look up tables allows finer tuning of LED current than the relatively coarse spacing afforded by the 8-bit raw data. Look up table values are determined based on test exposures, and have traditionally remained fixed for extended periods of time. The output of look up tables 52, 54, and 56 respectively drive the input of digital-to-analog converters 58, 60, and 62; which in turn drive red LED 64, green LED 66, and blue LED 68.

While printing, the LED's of FIG. 4 self heat to the extent that their efficiency in converting electrical current to light is diminished. The amount of heating and its impact on LED efficiency are repeatable, calculable characteristics of LED materials, mountings, and current load. The effect of the efficiency loss is to underexpose the media relative to the command level of the pixel data. Present LED printers provide no compensation for thermal effects.

A solution would be to measure or estimate the local temperature of the junction and, using thermal models, determine and generate an appropriate compensation current command to the LED's to obtain uniform color. Three general problems arise when attempting junction-level thermal compensation in the millisecond time scale for such LED printers. The first is measurement or accurate estimation of the temperature of the junction. The second is cost effective, real time derivation of an appropriate compensation current command to the LED because the high data rate makes the use of a microprocessor-based algorithm too slow. The third problem is that, in the case of a rotary LED printer, the junction temperature must be obtained remotely from the LED's due to space and power restrictions in the rotating printhead environment.

U.S. Pat. No. 4,982,203 to Uebbing et al. discloses the use of a mathematical model to predict efficiency loss as a function of LED aging. A series of pre-calculated tables of drive currents versus data versus age are pre-loaded in the printer and used as the basis for exposure control over life. Similarly, the effect of temperature on LED output is measured during the burn-in cycle. A table of compensation coefficients is stored in the machine and used to modify LED current commands depending on the measured average temperature of the head. This method cannot be applied to thermal transients responsive to the inaccessible temperature of an LED junction.

U.S. Pat. No. 4,771,219 to Ludolf et al. discloses a thermal compensation technique responsive to junction level thermal transients which compensates for pulse width modulation distortion of digital data driven through a modulated LED or diode laser system. The system is not extensible to amplitude modulated analog current systems.

U.S. Pat. No. 5,264,868 No. to Hadley et al. is typical of a variety of schemes which measure the bulk substrate temperature of an LED printing bar in an electrophotographic context and provide means for light output compensation through a multiplicative current gain adjustment.

U.S. Pat. No. 4,952,949 to Uebbing effects a bulk temperature measurement by sensing the temperature dependent forward voltage drop of a non-imaging LED integrated into a print array.

DISCLOSURE OF THE INVENTION

It is an object of the present invention to provide a cost effective apparatus and method for estimating LED printhead junction temperature as a function of an input data stream, and for automatically compensating the printhead drive signal to maintain proper printer calibration.

It is another object of the present invention to provide such automatic compensation by calculations that are performed a priori and applied in real time by fast memory lookups.

According to a feature of the present invention, junction-level compensation for efficiency loss of an LED as the LED warms due to thermal energy generation from an electrical drive current is effected by a plurality of selectable LED temperature-specific look up tables constructed for a plurality of different LED temperatures. The selected look up table produces an output for driving the LED when the selected look up table is accessed by the input data. A model of the thermal characteristics of the LED, its heat sink, and the structure attaching the LED to the heat sink is adapted to produce an estimate of the temperature of the LED as a function of the image data. An address decoder selects one of the plurality of look up tables to process the input data stream in accordance with the estimate produced by the model.

According to a preferred embodiment of the present invention, the estimate produced by the model is quantized into a plurality of steps equal in number to the plurality of look up tables. The model may be implemented by a low order finite impulse filter executed in programmable logic. The estimate produced by the model is updated on a per pixel basis, whereby the appropriate temperature dependent look up table is accessed for each pixel to be printed.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
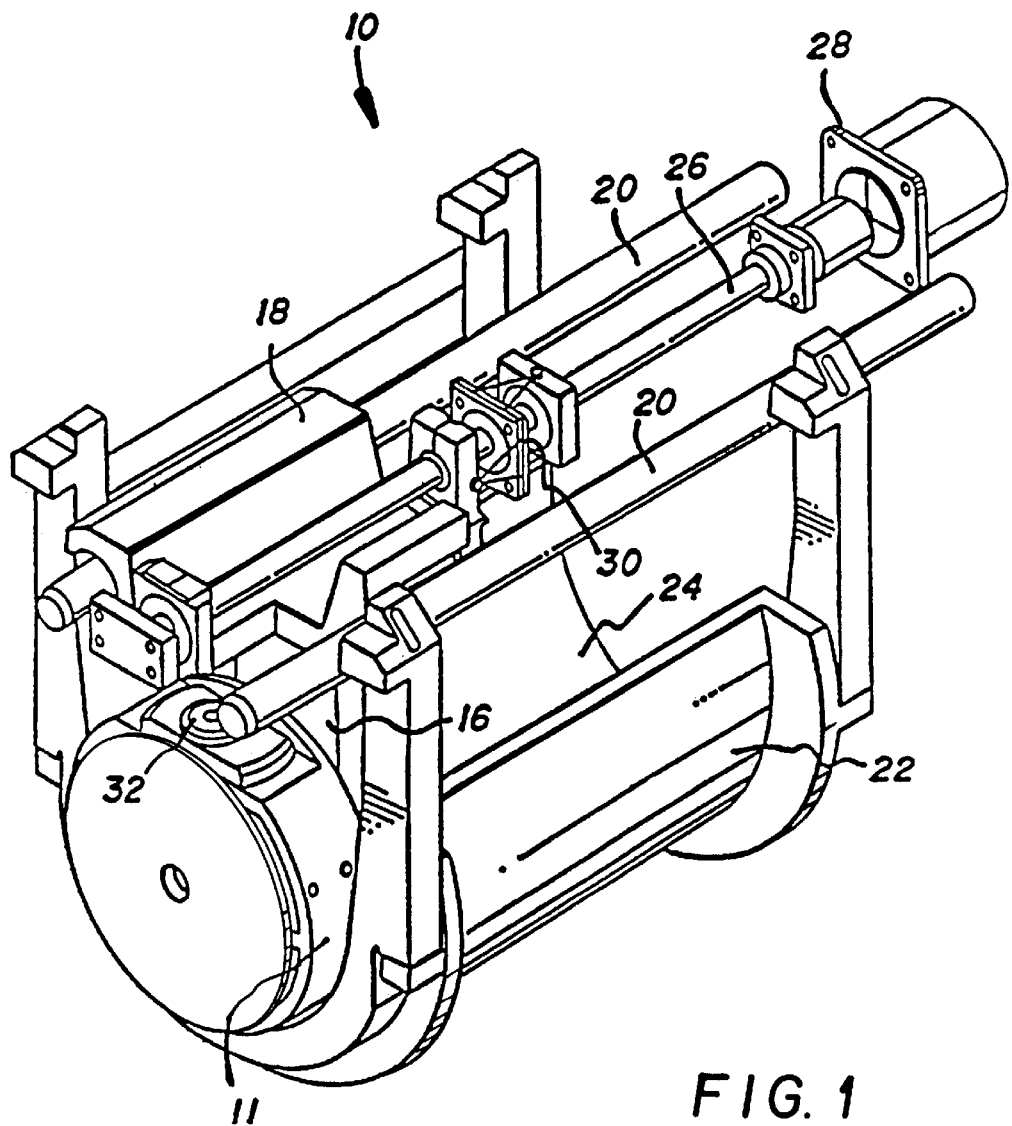
FIG. 1 is a perspective view of a prior art rotary printing system that utilizes an LED array positioned in a rotor.
Figure 2:
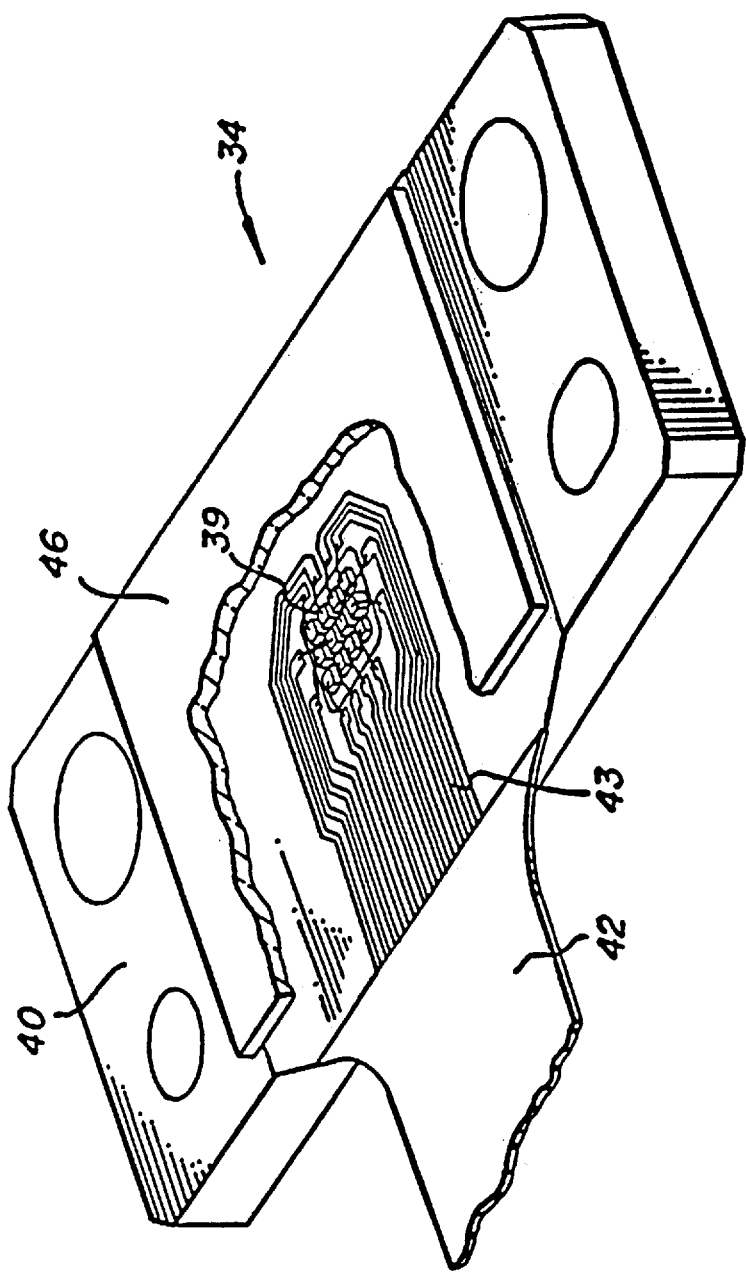
FIG. 2 is a greatly enlarged perspective view of a prior art LED array.
Figure 3:
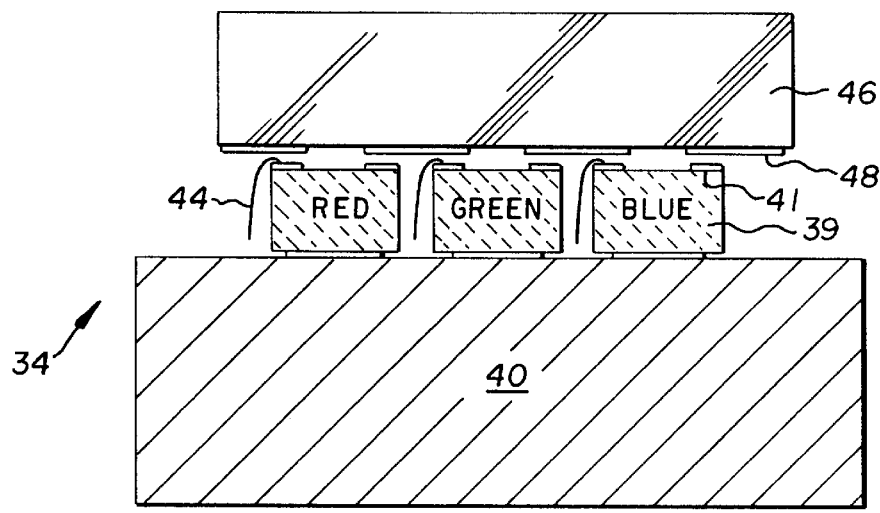
FIG. 3 is an enlarged schematic plan view of the LED array illustrated in FIG. 2.
Figure 4:
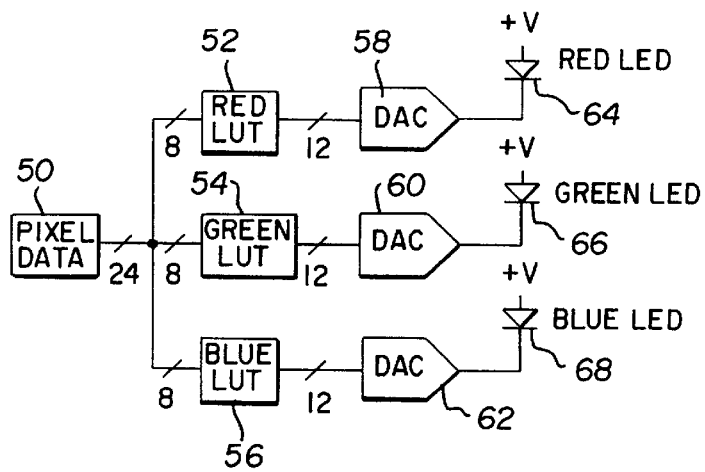
FIG. 4 is a schematic block diagram of the data path of the of the LED array illustrated in FIGS. 1 and 2.
Figure 5:
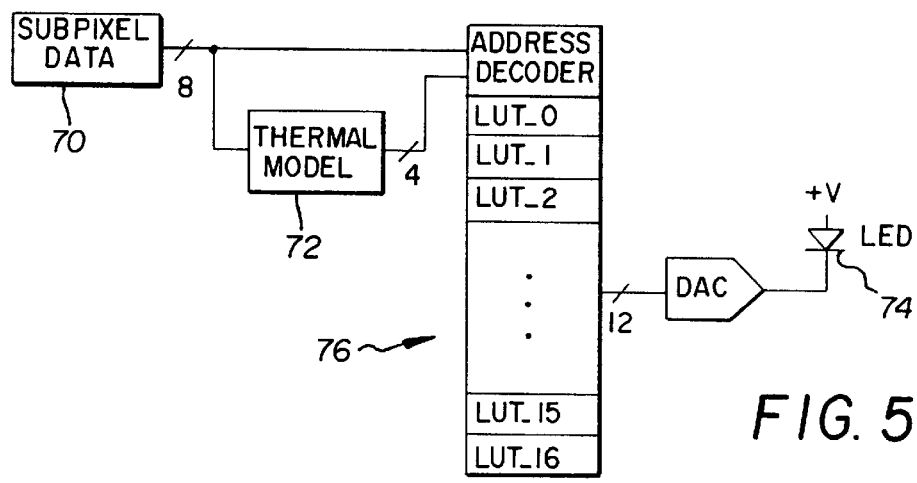
FIG. 5 shows one of three data path channels of an LED array according to the present invention.

FIG. 5 is a schematic block diagram of one of three color channels of an LED array printhead data path of a printer according to the present invention. We have found that the thermal performance of each of the three color channels is independent of the other channels. Furthermore, we have found that the worst case excursion in exposure can be compensated by increasing drive current for a given sub-pixel data increasing drive current for a given subpixel data command by less than 2%. Because there is negligible observable thermal crosstalk between color channels, compensation can be performed on a per channel basis.

A pixel of image information at 70 is represented by three 8-bit subpixel quantities representing one of the red, green and blue records. Subpixel data is linearly related to desired print densities, and is run through a first-order model 72 of the thermal characteristics of an LED 74 and of the LED's mounting structure. A simple first-order exponential model is sufficient to well capture the thermal behavior of printheads tested; although more complex models may be used. The time constant of the thermal model is derived from density measurements of simple test targets printed in the same manner as any other image.

The output of thermal model 72 is an estimate of the temperature of the LED as a function of the image data. The output of the thermal model is quantized into some number of steps. In the illustrated embodiment, sixteen levels of quantization are represented by four bits of information. such a thermal model can easily be implemented by a low order finite impulse response filter executed in programmable logic.

In order to compensate for the nonlinear relationship between LED current and developed density of an image receiver, the 8-bit subpixel data are processed through a plurality 76 of 12-bit look up tables. The 12-bit output of the look up tables drives the input of a digital-to-analog converter 78; which in turn drives LED 74.

It is possible to calibrate the data path for correct printing density to within, say, 0.1% of aim for any pixel command level by appropriate look up table construction. This is true for any LED temperature encountered in practice. From experimental calibration and model interpolation, look up tables can be built for elevated temperatures from a look up table derived from analysis of test patches exposed at ambient temperature.

In the embodiment of the present invention illustrated in FIG. 5, sixteen such temperature-specific look up tables have been calculated as part of the calibration procedure of the data path. At pixel print time, the color specific estimate of LED temperature provided by thermal model 72 is used to select the appropriate look up table. Pixel data is then used to access the look up table and to reference the appropriate density-related current drive level. The temperature estimate from thermal model 72 is updated on a per pixel basis so that the appropriate temperature dependent look up table is accessed for each pixel printed.

Three subsystems, one calibrated for each of the three thermal characteristics typical of red, green, and blue emitting semiconductors are required for full color calibration. Temperature compensated LED drive is provided without the use of high speed multipliers by simple lookup access to static memory implemented as an extension of look up table storage already required.

Alternative Embodiments

While the preferred embodiment is directed to the production of images on conventional photographic paper, it will be understood that the invention can be used with any type of photosensitive material including, but not limited to, conventional photographic film, and to films which are conventionally sensitized as well as those which are sensitive to infra-red radiation and those which are false sensitized. It will be appreciated that in such instances that the characteristics of the light emitted by the LED's will be selected to match the sensitivity, or combinations of sensitivity, of the photosensitive material being used.

Still further, it will be appreciated that should the nature of the photosensitive material require it, it is possible to use different numbers and arrangements of the LED array. For example, should the photosensitive material be particularly insensitive to a particular color light, additional columns of LED's producing that color light can be added to the array.

It will also be appreciated that, while the preferred embodiment contemplates varying only the light output to produce a continuous tone image, the exposure time may also be modulated, or a combination of the two may be employed, to provide the desired result.

The invention has been described in detail with particular reference to preferred embodiments thereof, but it will be understood that variations and modifications can be effected within the spirit and scope of the invention.

What is claimed:

1. Apparatus for effecting junction-level compensation for efficiency loss of an LED as the LED warms due to thermal energy generation from an electrical drive current, said apparatus comprising:
   a source of an input data
   a heat sink;
   an LED having a light emitting junction;
   structure attaching the LED to the heat sink, the structure creating a thermal barrier between the light emitting junction and the heat sink;
   a plurality of selectable LED temperature-specific look up tables constructed for a plurality of different LED temperatures, the selected look up table producing an output for driving the LED when the selected look up table is accessed by the input data;
   a model of the thermal characteristics of the LED, the heat sink, and the structure attaching the LED to the heat sink, the model being adapted to produce an estimate of the temperature of the LED as a function of the image data; and
   an address decoder for selecting one of the plurality of look up tables to process the input data stream in accordance with the estimate produced by the model.

2. Apparatus as set forth in claim 1 wherein the image data dependent estimate produced by the model is quantized into a plurality of steps equal in number to the plurality of look up tables.

3. Apparatus as set forth in claim 2 wherein the model is implemented by a low order finite impulse filter executed in programmable logic.

4. Apparatus as set forth in claim 1 wherein the image data dependent estimate produced by the model is updated on a per pixel basis, whereby the appropriate temperature dependent look up table is accessed for each pixel to be printed.

5. Apparatus as set forth in claim 1 wherein the model is a first-order model of the thermal characteristics.

6. Apparatus as set forth in claim 1 wherein the model is a first-order exponential model of the thermal characteristics.

7. Apparatus for effecting junction-level compensation for efficiency loss of a plurality of LED's as the LED's warm due to thermal energy generation from electrical drive currents, said apparatus comprising:
   a source of 3-color input data three LED's, each LED having a heat sink, a light emitting junction, and structure attaching the LED to the heat sink, the structure creating a thermal barrier between the light emitting junction and the heat sink;
   a plurality of selectable LED temperature-specific look up tables associated with each of the three LED's, each of the plurality of look up tables being (1) constructed for a plurality of different LED temperatures and (2) calibrated for the associated LED, the selected look up table producing an output for driving the associated LED when the selected look up table is accessed by the input data;
   a model of the thermal characteristics of the LED's, the heat sinks, and the structures attaching the LED's to the heat sinks, the model being adapted to produce an estimate of the temperature of the LED's as a function of the image data; and
   an address decoder for selecting one of the plurality of look up tables to process the input data stream in accordance with the estimate produced by the model.

8. A multi-beam color exposure system comprising:
   a plurality of LED's arranged to emit a plurality of light beams which are focused to form a plurality of individual writing spots on a photosensitive material, each LED having a heat sink, a light emitting junction, and structure attaching the LED to the heat sink, the structure creating a thermal barrier between the light emitting junction and the heat sink;

means for moving at least one of said plurality of LED's and said photosensitive material to produce relative movement therebetween in a fast scan direction;

means for moving at least one of said plurality of said LED's and said photosensitive material to produce relative movement therebetween in a slow scan direction, said LED's being arranged to form a plurality of writing spots on said photosensitive material as a plurality of substantially parallel lines of said writing spots, said lines of writing spots being disposed substantially parallel to the fast scan direction;

a plurality of selectable LED temperature-specific look up tables associated with each of the plurality of LED'S, each of the plurality of look up tables being (1) constructed for a plurality of different LED temperatures and (2) calibrated for the associated LED, the selected look up table producing an output for driving the associated LED when the selected look up table is accessed by the input data;

a model of the thermal characteristics of the LED'S, the heat sinks, and the structures attaching the LED's to the heat sinks, the model being adapted to produce an estimate of the temperature of the LED's as a function of the image data; and an address decoder for selecting one of the plurality of look up tables to process an input data stream in accordance with the estimate produced by the model.

* * * * *